Oct. 25, 1966   R. M. THEITS ETAL   3,280,562
THRUST REVERSING DEVICE FOR FAN TYPE JET ENGINES
Filed Sept. 30, 1963   3 Sheets-Sheet 2
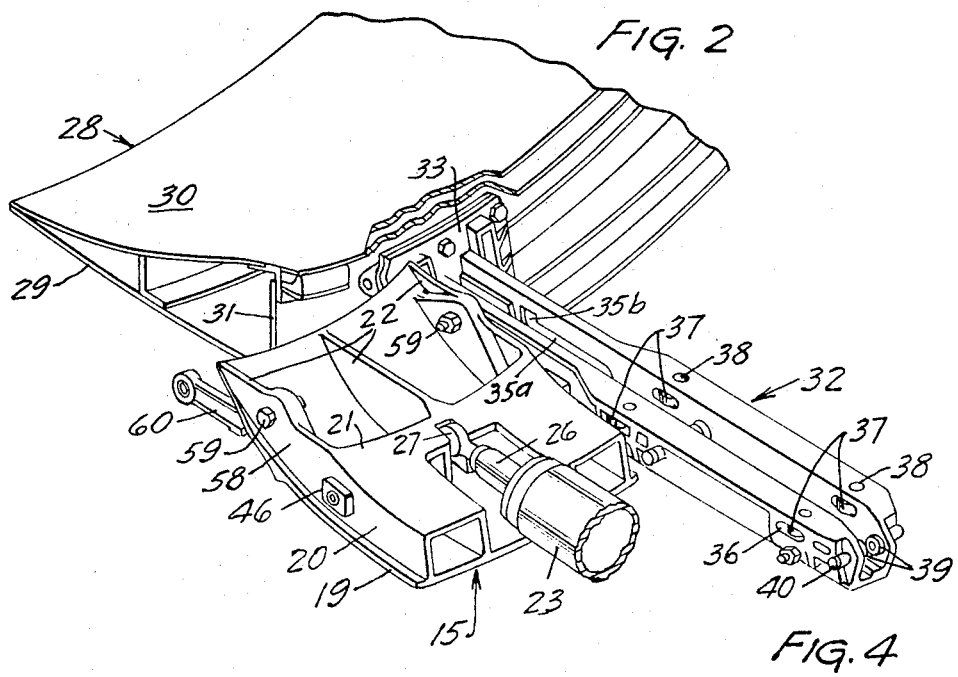
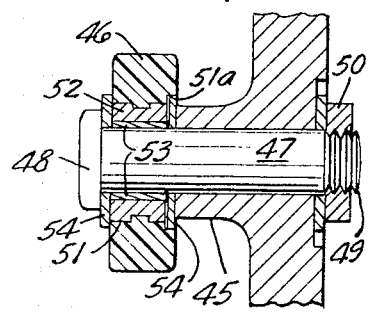
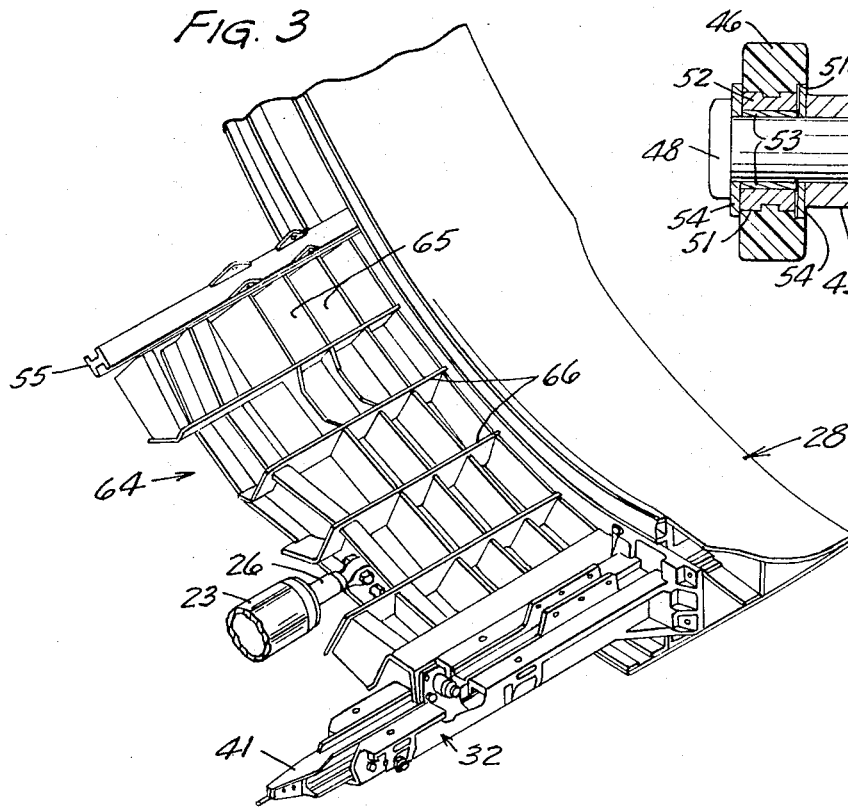

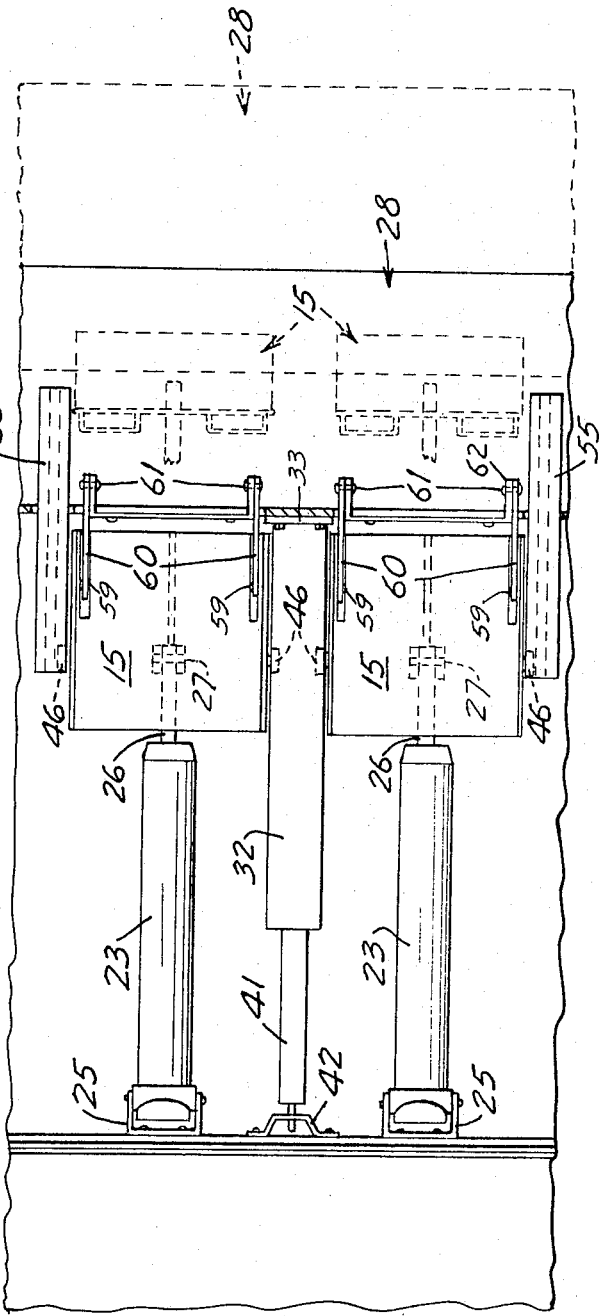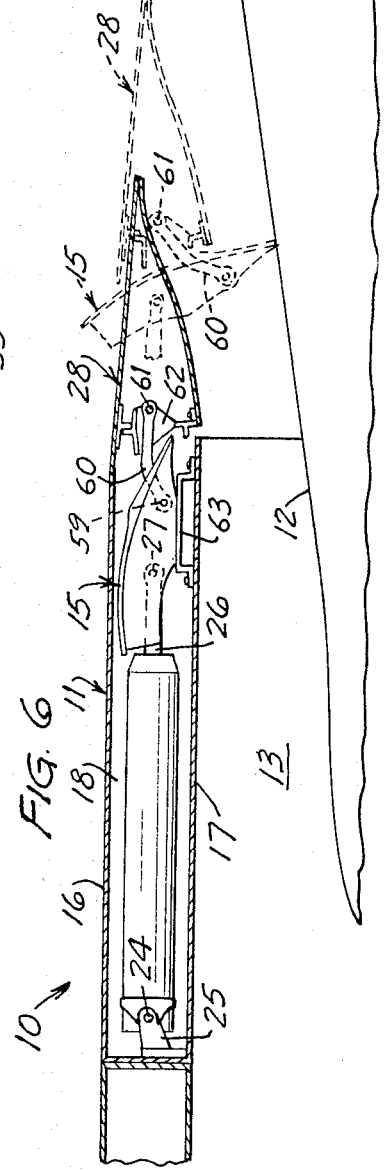

United States Patent Office 3,280,562
Patented Oct. 25, 1966

3,280,562
THRUST REVERSING DEVICE FOR FAN TYPE JET ENGINES
Russell M. Theits, St. Paul, Kenneth H. Groth, Minneapolis, Wesley V. Medin, Lindstrom, and Robert E. Lay, St. Paul, Minn., assignors to Northwest Airlines, Inc., St. Paul, Minn., a corporation of Minnesota
Filed Sept. 30, 1963, Ser. No. 312,466
3 Claims. (Cl. 60—229)

This invention relates to fan jet engines for aircraft and more particularly to forward thrust reversing devices for fan jet engines.

An object of this invention is the provision of a fan jet type engine with a forward thrust reversing device including a plurality of blocker door members and a fan cowl ring assembly mounted on the fan cowl for shifting movement into and out of obstructing relation with respect to the air passage between the fan cowl and the engine cowl to reverse the rearward flow of air therethrough and to diminish the component of forward thrust produced thereby, each blocker door member being mounted for movement by slide elements formed of material having a low coefficient of friction whereby the slide elements effectively slide along track means without jamming and are constructed to retain its shape when subjected to the vibration impulses produced by the engine and thereby serve to minimize any tendency of damage and malfunctioning of the thrust reversing device.

Another object of this invention is to provide a forward thrust reversing device for a fan type jet engine, wherein blocker door members are mounted for fore-and-aft shifting movement into and out of obstructing relation with respect to the air passage between the fan cowl and the engine cowl to reverse the rearward flow of air therethrough, each blocker door member being supported for movement along opposed tracks by substantially rectangular non-metallic, slide elements formed of a material, preferably nylon, having a low coefficient of friction, and capable of withstanding without deformation the vibration impulses produced by the engine during operation thereof, the slide elements being easily slidable in the associated track members without jamming or binding.

A further object of this invention is the provision in a fan type jet engine of a forward thrust reversing device of the class described, wherein each slide element is securely connected to the associated blocker door member in a manner to prevent accidental disconnection therefrom but permitting free pivoting movement of the slide elements relative to the associated blocker door member.

These and other objects and advantages of the invention will more fully appear from the following description made in connection with the accompanying drawings wherein like character references refer to the same or similar parts throughout the several views, and in which:

FIG. 2 is a fragmentary perspective view on an enlarged scale illustrating a detailed construction of a blocker door assembly and the cooperative relation with the cowl ring assembly;

FIG. 3 is a fragmentary front perspective view of the lower portion of the forward thrust reverser device illustrating the interrelation of the cascade vane mechanism with the cowl ring assembly;

FIG. 4 is a cross sectional view on an enlarged scale illustrating the detailed construction and mounting of a slide element for one of the blocker door members;

FIG. 5 is a top plan view on an enlarged scale illustrating the cooperative relation of a pair of blocker door assemblies with respect to the fan cowl ring structure;

FIG. 6 is a fragmentary sectional view of a fan cowl with a blocker door member and the fan cowl ring illustrated in an adjusted position by dotted line configuration.

Figure 1:
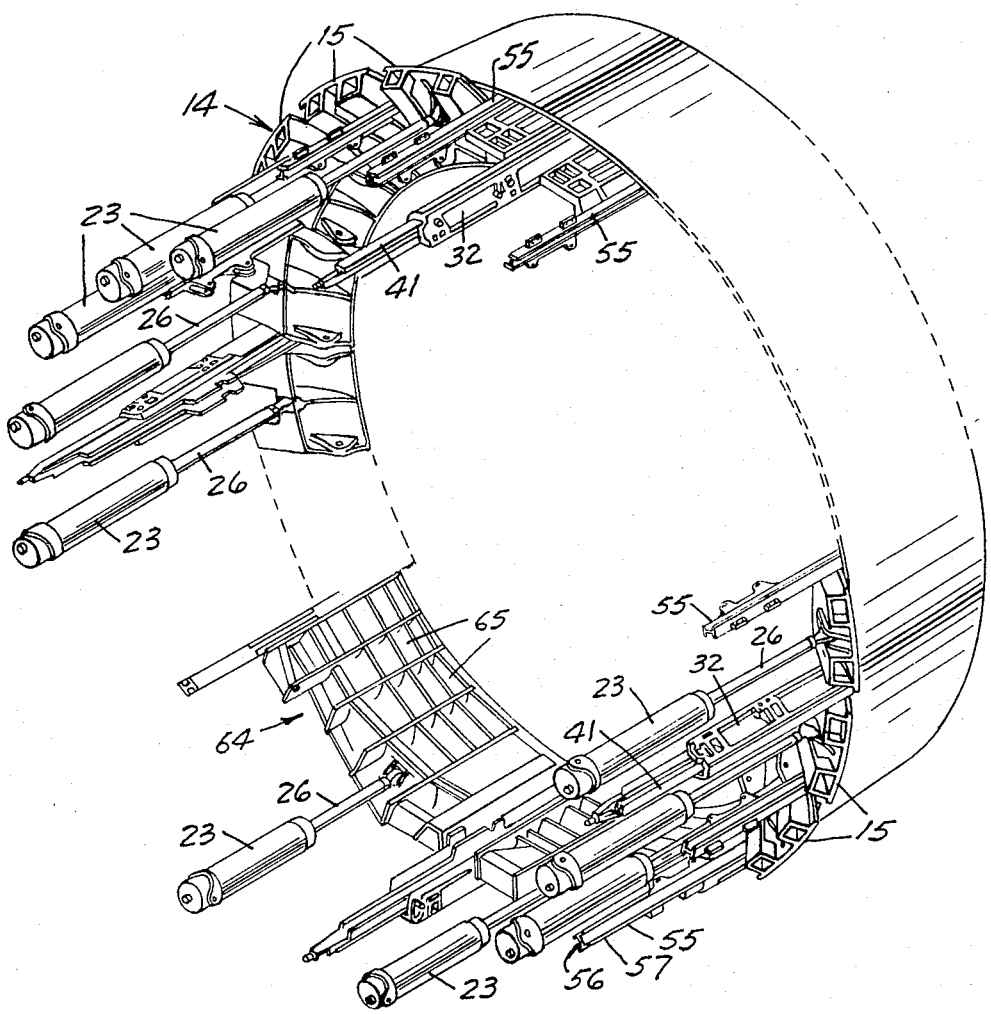
FIG. 1 is a front perspective view of a fan type jet engine forward thrust reverser device with certain parts thereof illustrated by dotted line configuration and other parts thereof omitted for clarity.

Referring now to the drawings, it will be seen that one embodiment of the invention is thereshown. In a fan type jet engine for aircraft, the air used in the fuel system of such engine is not only impelled axially rearwardly interiorly through the engine cowl by the fan stage or stages of the engine, but air is also impelled rearwardly by the fan stage through the annular passage defined between the fan cowl structure and the engine cowl. This annular rearwardly flowing stream of air also serves to impart a component of forward thrust during operation of the fan jet engine. Referring now to FIG. 6, it will be seen that a fan type aircraft jet engine designated generally by the reference numeral 10, is fragmentarily illustrated and in which the fan cowl 11 is mounted exteriorly upon the forward portion of the engine cowl 12. An annular passage 13 is defined between the fan cowl 11 and the jet cowl 12 and a rearwardly directed stream of air passes through this annular passage 13 to produce a forward component of thrust during operation of the engine. During landing operations it is necessary to reduce the overall thrust produced by the engine and one manner in which this is accomplished is to reverse the annular stream of air passing between the fan cowl and the engine cowl and to diminish if not render ineffective the forward component of thrust produced by this annular stream of air.

To this end, means are provided for obstructing and reversing the annular flow of air passing rearwardly through the annular passage 13. This means comprises a forward thrust reverser device designated generally by the reference numeral 14 and carried by the fan cowl 11. This forward thrust reverser device 14 includes a blocker door assembly comprised of a plurality of substantially identical blocker door members 15 preferably formed from cast aluminum and mounted for rectilinear and pivotal movement relative to the fan cowl 11. Referring now to FIG. 6 it will be seen that the blocker door members 15 are shiftable from a retracted forward position to a rearward position wherein the blocker door members are disposed in substantially obstructing relation with respect to the passage 13. The fan cowl 11 is comprised of an annular exterior wall member 16 and an interior annular wall member 17 joined together and radially spaced-apart to define an annular chamber 18 therebetween. It will be seen that the blocker door members 15 are disposed within the annular chamber 18 when in the forward retracted position and are disposed exteriorly of the annular chamber 18 when in the rearward position.

Refering now to FIG. 2 it will be seen that each blocker door member 15 is comprised of a substantially rectangular panel 19 having reinforcing channel elements 20 integrally formed with the upper or forward surface of the panel, these channel elements being integrally joined by a suitable central web portion 21. The channel elements 20 and the central web portion 21 thereof have rearward extensions 22 which form reinforcing ribs and cooperate with the channel elements to suitably reinforce the blocker doors to withstand the fluid pressure exerted by the stream of air.

Means are provided for shifting the blocker door members 15 in a fore-and-aft direction and this means comprises a plurality of pneumatic cylinders 23 positioned within the annular chamber 18 of the fan cowl 11 and extending axially thereof. These pneumatic cylinders are pivotally connected by pivot pins 24 to U-shaped brackets 26 mounted within the annular chamber 18 of the fan cowl 11. A piston rod 26 is provided for each pneumatic cylinder 23 and the rear end of each piston rod is pivotally connected to the web portion 21 of each blocker door member at a centrally located recess therein. Thus upon extension of each piston rod 26, the associated blocker door member 15 will be caused to shift rearwardly exteriorly of the annular chamber 18 of the fan cowl 11. Retraction of the piston rod 26 of each pneumatic cylinder 23 causes corresponding forward retractive movement of the associated blocker door member 15.

The cowl ring structure 28 is connected to the fan cowl 11 for fore-and-aft translation relative thereto during shifting movement of the blocker door assembly. It will be seen that the cowl ring structure 28 includes an annular exterior wall member 29 and an annular interior wall member 30 which converge and are joined together at their rearward terminal portions. The forward marginal edges of the interior and exterior annular walls of the cowl ring structure are joined together by an annular vertical wall member 31, as best seen in FIG. 2. It will be noted by reference to FIGS. 6 and 7 that the cowl ring structure 28 when in the forward position actually engages the fan cowl and constitutes a rearward extension of the fan cowl. The interior annular wall member 30, as best seen in FIG. 6, flares slightly outwardly in a rearward direction while the exterior wall member thereof is disposed in substantially coplanar relation with respect to the exterior wall of the fan cowl 11. It will also be noted that the cowl ring structure 28 closes the annular chamber 18 when in the forward position and is mounted for translating movement relative to the cowl ring to the rear position wherein the annular chamber 18 is opened rearwardly to permit the passage of the blocker door members exteriorly thereof.

Figure 7:
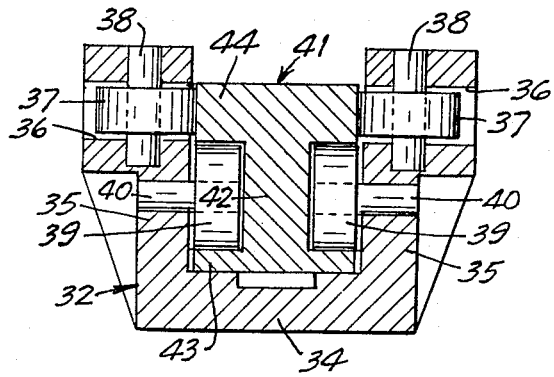
FIG. 7 is a cross sectional view on an enlarged scale taken through member 32.

The means mounting the cowl ring structure on the fan cowl 11 for fore-and-aft translation relative thereto comprises a plurality of substantially identical elongate forwardly projecting carriage members 32, each mounted at its rear end by means of a bracket 33 to the vertical wall member 31 of the cowl ring structure. In the embodiment shown, four such carriage members are provided and are spaced approximately ninety degrees apart. Each of these carriage members, as best seen in FIG. 7, is of substantially channel-shaped configuration including a web portion 34 having a pair of legs or flanges 35 integrally formed therewith and projecting therefrom. Each carriage member has a plurality of longitudinally extending openings 36 therein in which are positioned horizontally oriented rollers 37 each of which is mounted for rotation about a substantially vertical pin or axle 38. It will be noted that these rollers 37 are arranged in opposed pairs, each pair being spaced longitudinally of the associated carriage member 32. It will also be noted that these rollers 37, as best seen in FIG. 7, project slightly inwardly of the inner surfaces of the associated legs of the carriage members. Each carriage members is also provided with a plurality of vertically disposed rollers 39 each revolvably mounted upon a horzontally disposed axle or pin 40 and each being mounted upon the inner surface of one of the legs 35 of the associated carriage member 32. It will also be noted that the rollers 39 are arranged in opposed pairs, each pair being spaced slightly forwardly of the adjacent pair of horizontal rollers 37.

Each carrage member 32 is slidably mounted upon a track member 41 which, as best seen in FIG. 7, is of substantially I-shaped cross sectional configuration. The track member 41 is rigidly connected at its respective ends by suitable brackets 42 to the fan cowl 11. It will be noted that the track members are actually positioned within the fan cowl chamber 18 and each includes a central web portion 41a having a lower flange or leg 43 and an upper flange or leg 44 integrally formed therewith. It will be noted that the upper flange 44 has a thickness dimension substantally greater than the thickness dimension of the lower flange 43. The outer edges of the upper flange 44 are engaged in bearing relation by the horizontally oriented rollers 32 and the under surface of the upper flange is rollingly engaged by the vertically oriented rollers 39.

The blocker door members 15 are also provided with means for permitting controlled rectilinear and pivotal movement thereof during shifting of the blocker door members in a fore-and-aft direction. To this end, the outer leg or flange of each reinforcing channel element 20 for each blocker door member 15 has an outwardly projecting tubular or embossed element 45 integrally formed therewith. A substantially rectangular track engaging pivotal slide element 46 is pivotally connected to the embossed element 45 at each side of each blocker door member by a bold 47 having an enlarged head 48 at one end and being threaded as at 49 at its other end. The threaded end of the bolt 47 is treadedly engaged by a suitable nut 50 to securely but pivotally connect the slide element 46 to the associated blocker door members 15.

Referring again to FIG. 4, it will be seen that each of the slide elements 46 has a centrally located circular aperture 51 therethrough. The slide elements are preferably formed from a high temperature nylon sheet and therefore have a relatively low coefficient of friction. A bushing or sleeve 52 preferably formed of a corrosion resistant steel is pressed or otherwise fixedly mounted within the aperture 51 of the slide element whereby the outer circuferential surface of the bushing snugly engages the inner peripheral surface of the associated slide element. It will be noted that the axial dimension of the bushing 52 is slightly less than the thickness dimension of the associated slide element, one side of the slide element being recessed as at 51a.

A sleeve or brushing bearing element 53 is interposed in coaxial relation between the bolt 47 and the sleeve 52. The axial dimension of the bushing bearing 53 is slightly greater than the thickness dimension of the slide element 46 taken through the recessed portion 51a thereof. It will be seen that when each slide element 46 is mounted upon the associated bolt 47, washer or spacer elements 54 are disposed on opposite sides of the slide elements. It will be noted that the innermost of the washer elements 54 is received within the recess 51a, and that these washer elements actually engage the respective ends of the bushing bearing 53 since this bushing bearing has an axial dimension greater than the thickness dimension of the slide element adjacent the recessed portion therof. Thus each slide element 46 while being securely connected to its associated blocker door member 15, is also connected thereto for pivotal movement about its mounting bolt 47.

Referring now to FIGS. 1 and 5 it will be seen that a plurality of track members 55 are mounted within the annular chamber 18 of the fan cowl 11 and extend axially, exteriorly rearwardly thereof. It will be seen that these track members extend into the cowl ring structure 28 through suitable apertures therein when the cowl ring structure is in the forward position. These track members 55 are circumferentially spaced-apart a distance so that an adjacent pair of such track elements accommodate the slide elements 46 of a blocker door member 15. It will also be noted, however, that those blocker door members disposed adjacent the carrage member 32 have one of their slide elements slidably positioned within the track member 41 engaged by the associated carriage member 32. The track members 55 are of substantially I-shaped configuration including a web portion 56 having opposed flanges 57 integrally formed therewith. Thus each track member 55 actually defines two guide or trackways for accommodating the slide elements of adjacent blocker door members. It will also be noted that each of the track members 41 for each carriage member 32 also accommodates the slide elements of adjacent blocker door members. In order for the slide elements mounted in the track members 41 to be properly seated therein, the legs 35 of each of the carriage members has an elongate slot 35a therein through which the slide elements 46 of adjacent blocker door members project. It will also be noted that the rear end of the slots 35a, as best seen in FIG. 2, are enlarged as at 35b to permit passage of the slide elements into seated relation within the associated track member 41.

Means are also provided for causing pivotal movement of the blocker door members when these blocker door members have passed exteriorly of the annular chamber 18 of the fan cowl 11. Referring again to FIGS. 2, 5 and 6 it will be seen that the rearward extensions or ribs 22 of the reinforcing elements 20 for each blocker door member are actually thickened to define downwardly facing hollow socket elements 58 each being suitably apertured to receive a pivot bolt assembly 59 therethrough. Each socket element receives the forward end portion of an elongate curved pivot link 60 therein, the forward end portion of each pivot link 60 being suitably apertured for pivotal mounting upon the bolt assembly 59. The rearward end of each pivot link 60 is also suitably apertured and is pivotally connected by a pivot bolt assembly 61 to a bracket member 62 carried by the vertical wall 31 of cowl ring structure 28. Thus it will be seen that each blocker door member 15 is interconnected as best seen in FIGS. 5 and 6 by a pair of pivot links 60 to the cowl ring structure 28 so that the blocker door members will be caused to pivot about the pivotal axis defined by the bolts 47. It is pointed out that the bolts 47 which mount the slide elements upon the associated blocker door member are disposed in substantially coaxial relation.

Means are also provided for preventing pivoting or tilting movement of the blocker door members while these blocker door members are disposed interiorly of the annular chamber 18. To this end it will be seen that a plurality of positioning slide elements 63 are circumferentially arranged within the annular chamber 18 of the fan cowl 11 and are affixed to the outer surface of the interior annular wall member 17. It will be noted that one of these elongate, substantially flat positioning elements is associated with each of the blocker door members 15, each blocker door member having a bearing surface 22a which engages the associated door member engaging element 63 during movement of the blocker door member in a fore-and-aft direction while the blocker door member is disposed within the annular chamber 18. Thus during the initial movement of each blocker door member in a rearward direction, the movement is entirely rectilinear as is the movement of the cowl ring structure 28. However, as the blocker door members are moved exteriorly of the annular chamber 18 so that the blocker door members are no longer in engaging relation with the positioning slide element 63, the blocker door members will then pivot about the axis defined by the bolts 47.

It will be seen that the bearing surface of each blocker door member actually constitutes the edge 22a of the rearwardly extending rib of the web portion 21 for each blocker door member. The positioning slide element for each blocker door presents an elongate substantially flat surface engaged by the edge 22a whereby the blocker door member is caused to shift rectilinearly during the major portion of the stroke of the associated piston rod 26. However, when the blocker door member is shifted exteriorly of the annual chamber 18, further extension of the piston rod causes the blocker door member to pivot about its pivotal axis.

During operation of the forward thrust reverser device 14, the blocker door assembly and the cowl ring structure 28 will be disposed in the forward position, the cowl ring structure actually forming the rearward extension of the fan cowl 11. As pointed out above, air passing through the annular passage 13 exteriorly of the engine cowl 12 produces a component of forward thrust which component of forward thrust will be rendered ineffective or substantially diminished when the blocker door assembly is shifted into obstructing relation with respect to the rearwardly passing stream of air.

Therefore when the pneumatic cylinder and piston units are actuated to cause extension of the piston rod 26, the blocker door members 15 and the cowl ring structure 28 will be shifted rearwardly from the forward position. During the initial movement of the blocker door members 15, the doors will be shifted rectilinearly until the blocker door members are moved exteriorly of the annual chamber 18. Because of the interconnection of each blocker door member 15 with the cowl ring structure 28, the latter portion of the rearward stroke of the piston rod 26 causes the associated blocker door member to pivot about the bolts 47. The blocker door members will therefore be moved into obstructing relation with respect to the annular passage 13 whereby the rearwardly passing stream of air will be reversed in a forward direction and the component of forward thrust produced by this stream of air passing will be greatly diminished.

Referring now to FIGS. 1 and 3 it will be seen that a cascade vane structure 64 replaces one of the blocker door members adjacent the lower portion of the reverser device 14. This cascade vane structure 64 is comprised of a plurality of vane elements 65 interconnected by suitable transverse frame elements 66, the vane elements and transverse frame elements all being secured to a suitable frame. The cascade vane structure 64 is provided with a pair of slide elements 46 at opposite sides thereof, one of the slide elements 46 engaging in a trackway of one of the track members 55 and the other slide element being movable in a trackway of one of the track members 41. This cascade vane structure is of conventional construction with respect to fan type jet engines and is shiftable with the blocker door assembly in a fore-and-aft direction. The cascade vane structure 64 is connected at its rearmost end to the cowl ring structure 28 and is movable therewith. It will also be seen that the cascade vane structure 64 is also provided with a pneumatic piston and cylinder actuator for producing shifting movement thereof.

The cascade vane structure 64 will be moved rectilinearly rearwardly when the blocker door assembly is moved and will positively cause some of the air being deflected by the blocker door assembly to be directed forwardly and slightly laterally to thereby minimize the danger of foreign debris or matter being blown forwardly for entry into the jet engine during the landing operation. Further this arrangement minimizes the tendency of hot gases also being directed forwardly for entry into the engine. The cascade vane structure will, of course, be retracted within the annular chamber 18 during the return stroke of the piston rods 26.

During operation of the engine 10, the slide elements 46 will be subjected to vibration impulses of an extremely high order and therefore these slide elements must be constructed of a material capable of withstanding distortion when subjected to these vibration impulses. It has been found that through the use of substantially rectangular slide elements formed of high temperature nylon plastic material, these slide elements will not deform and will retain their shape even when subjected to these vibration impulses for long periods of time. Since the slide elements are formed of a material having a low coefficient of friction, these slide elements will very easily slide in their associated guideways and will wear only slightly even through periods of extensive use and even though the tracks in which the guide members slide are formed of metal. It will be noted that the track engaging surfaces 46a having arcuately shaped ends 46b to facilitate movement of the slide elements within their associated trackways.

The particular manner of connecting the slide elements to their associated blocker door members not only permits positive connection of these slide elements to the blocker door members but permits relative pivoting between the slide elements and the blocker door members.

It will therefore be seen from the foregoing description that we have provided a unique manner of mounting a blocker door assembly in a forward thrust reverser device for fan type jet engines wherein any tendency of the blocker door members to jam during shifting movement thereof is greatly minimized, if not precluded.

It will also be seen from the preceding paragraphs that each blocker door member is mounted for rectilinear and pivotal movement by means of slide elements formed of a non-metallic, preferably nylon material which has a lower coefficient of friction to facilitate sliding thereof in the interrelated trackways, and also constructed to withstand deformation even when subjected to vibration impulses produced by the engine.

Thus it will be seen that we have provided a unique means for mounting blocker door assemblies for fan type jet engines which mounting means not only have a substantially long life, thus obviating the necessity of constant replacement, but which are so arranged and constructed as to minimize malfunctioning of the blocker door assemblies.

If will, of course, be understood that various changes may be made in the form, details, arrangement and proportions of the various parts without departing from the scope of our invention.

What is claimed is:

1. In a fan jet engine of the type including a fan cowl structure mounted exteriorly upon the forward portion of the engine cowl and defining an annular passage therebetween through which a rearwardly directed stream of air passes to produce a component of forward thrust, the fan cowl structure including spaced-apart annular exterior and interior wall members defining a rearwardly opening annular chamber therebetween:

a thrust reversing device for reversing the rearward flow of air through the annular passage between the fan cowl structure and the engine cowl to diminish the component of forward thrust produced thereby, said device comprising a plurality of blocker door members each having mounting connections with the fan cowl structure for rectilinear and pivotal shifting movement relative thereto between a normally retracted forward position within the annular chamber of the fan cowl structure and an extended rearward position exteriorly of the fan cowl structure, an annular cowl ring shiftably mounted on the fan cowl structure for fore-and-aft translation between a normal forward position and a rearward position, said fan cowl ring when in said forward position closing the chamber defined by the exterior and interior wall members of the fan cowl structure and defining a rearward extension of the fan cowl structure, and said fan cowl ring when in the rearward position being spaced rearwardly of the opening of the fan cowl structure chamber, means interconnecting the fan cowl ring and the blocker door members and causing swinging movement of the blocker door member into obstructing relation with respect to the annular passage between the fan cowl structure and the engine cowl during rearward movement of said blocker door members and said fan cowl ring, to thereby reverse the rearward flow of air through the annular passage and to diminish the forward component of thrust produced thereby, means carried by said fan cowl structure and operatively connected with said blocker door members and said fan cowl ring for producing forward and rearward shifting movement of the blocker door members and said fan cowl ring, said mounting connection for each blocker door member including a plurality of circumferentially spaced-apart track members mounted within the chamber of the fan cowl structure and extending axially thereof, the improvement comprising a pair of generally rectangular shaped track engaging slide elements supporting each blocker door member for sliding and pivotal movement between a pair of adjacent generally channel shaped track members, said slide elements being formed of a non-metallic, generally non-malleable material having a low coefficient of friction, each slide element being pivotally mounted in one side of the associated blocker door member and being slidable in relatively close tolerance relation in the adjacent track member during fore-and-aft shifting movement of the associated blocker door member.

2. The device as defined in claim 1 wherein said slide elements are each formed of a nylon material.

3. The device as defined in claim 1 wherein each of said slide elements is formed of a plastic material and each has a centrally located circular opening therethrough:

each slide element having an annular sleeve element fixedly mounted within said opening, the inner annular surface of said sleeve element defining a bearing surface, and a bearing sleeve member extending through said sleeve element and having an axial length greater than the associated slide element, and means for fixedly mounting each bearing sleeve to the associated blocker door member.

References Cited by the Examiner

UNITED STATES PATENTS

| 2,931,171 | 4/1960 | Tyler et al. | 60—35.54 |
| 3,036,431 | 5/1962 | Vdolek | 60—35.54 |

MARK NEWMAN, *Primary Examiner.*

A. L. SMITH, *Assistant Examiner.*